(12) United States Patent
Sarin

(10) Patent No.: US 10,902,404 B2
(45) Date of Patent: Jan. 26, 2021

(54) OFFLINE TRANSACTIONS USING A PRIMARY ELECTRONIC DEVICE OR A SECONDARY ELECTRONIC DEVICE COUPLED THERETO

(71) Applicant: PAYPAL, INC., San Jose, CA (US)

(72) Inventor: Pankaj Sarin, New Delhi (IN)

(73) Assignee: PAYPAL, INC., San Jose, CA (US)

( * ) Notice: Subject to any disclaimer, the term of this patent is extended or adjusted under 35 U.S.C. 154(b) by 1441 days.

(21) Appl. No.: 14/970,852

(22) Filed: Dec. 16, 2015

(65) Prior Publication Data

US 2017/0178091 A1   Jun. 22, 2017

(51) Int. Cl.
*G06Q 20/32* (2012.01)
*G06Q 20/28* (2012.01)
*G06Q 20/10* (2012.01)
*H04M 1/725* (2006.01)

(52) U.S. Cl.
CPC ....... *G06Q 20/3224* (2013.01); *G06Q 20/105* (2013.01); *G06Q 20/28* (2013.01); *G06Q 20/3226* (2013.01); *H04M 1/7253* (2013.01)

(58) Field of Classification Search
CPC .. G06Q 20/3224; G06Q 20/105; G06Q 20/28; G06Q 20/3226; H04M 1/7253
USPC .......................................................... 705/39
See application file for complete search history.

(56) References Cited

U.S. PATENT DOCUMENTS

| | | | |
|---|---|---|---|
| 2014/0237123 A1* | 8/2014 | Dave ..................... | H04M 19/04 709/227 |
| 2015/0278796 A1* | 10/2015 | Jiang .................. | G06Q 20/3224 705/44 |
| 2016/0316314 A1* | 10/2016 | Swaminathan ......... | H04L 67/28 |
| 2017/0053268 A1* | 2/2017 | Pande .................. | G06Q 20/363 |
| 2017/0139012 A1* | 5/2017 | Smith ............... | H04W 52/0277 |

OTHER PUBLICATIONS

D'Orazio, Dante. "Apple Watch works with Apply Pay to replace your credit cards," TheVerge.com, (Sep. 9, 2014). (Year: 2014).*

* cited by examiner

*Primary Examiner* — Elizabeth H Rosen
(74) *Attorney, Agent, or Firm* — Haynes and Boone, LLP

(57) ABSTRACT

A battery level of a primary electronic device is monitored by one or more hardware processors of the primary electronic device. A determination is made by the one or more hardware processors that the monitored battery level of the primary electronic device has dropped below a threshold. In response to the determination, a first amount of funds is electronically loaded to a secondary electronic device for offline purchases. The secondary electronic device is communicatively coupled to the primary electronic device. An offline electronic transaction is processed using the secondary electronic device based on the first amount of funds.

20 Claims, 11 Drawing Sheets

KEY TO FIG. 5

__US 10,902,404 B2__

OFFLINE TRANSACTIONS USING A PRIMARY ELECTRONIC DEVICE OR A SECONDARY ELECTRONIC DEVICE COUPLED THERETO

BACKGROUND

Field of the Invention

The present invention generally relates to systems and methods for facilitating electronic transactions offline.

Related Art

More and more consumers are purchasing items and services over electronic networks, such as the Internet. Consumers routinely search for and purchase products and services from merchants and individuals alike. The transactions can take place directly between an on-line merchant or retailer and the consumer, where payment had traditionally been made by entering credit card or other financial information.

Recently, rapid technological advances in mobile electronic devices such as smartphones and tablet computers have also enhanced the popularity of conducting electronic payments using these mobile electronic devices. Instead of carrying cash or credit cards in a wallet, a consumer may simply use his or her mobile electronic device to conduct the transactions electronically. However, it may not be feasible to use a mobile electronic device to conduct electronic transactions when the mobile electronic device is experiencing Internet connectivity problems, or when its battery power is about to run out. When these problems occur, the mobile transactions may be delayed, canceled, or unable to be processed.

Therefore, although existing systems and methods of conducting electronic transactions with mobile electronic devices are generally adequate for their intended purposes, they have not been entirely satisfactory in every aspect. What is needed is a system and method that allows a consumer to conduct electronic transactions offline in anticipation of problems that may prevent the mobile electronic device from being used to conduct online electronic transactions.

BRIEF DESCRIPTION OF THE FIGURES

FIG. 5, which has been split up into

Figure 1:
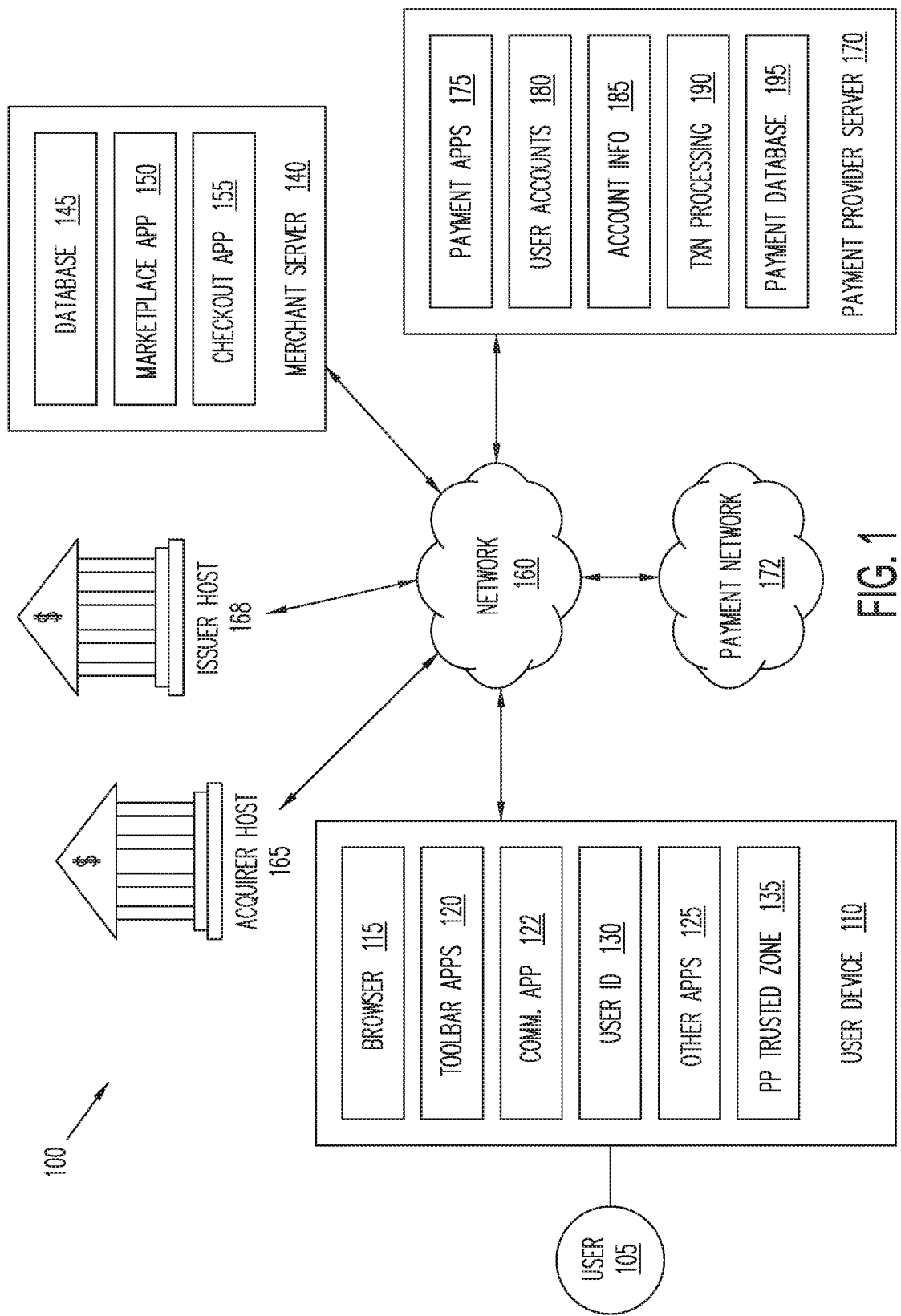
FIG. 1 illustrates a block diagram of a networked architecture suitable for conducting electronic online transactions according to embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

Online transactions are becoming more and more prevalent, with an ever-increasing number of online entities that may or may not have a physical real world counterpart. The services offered by these online entities have been improving as well. The popularity of online transactions is partially attributable to the ease and convenience of conducting a transaction online instead of at a physical location. Consumers may routinely search for and purchase products and services from merchants and individuals alike. The transactions can take place directly between an on-line merchant or retailer and the consumer, where payment is typically made by entering a credit card number or other financial information. Transactions can also take place with the aid of an on-line payment provider, such as PayPal, Inc. of San Jose, Calif. Such payment providers can make transactions easier and safer for the parties. Payment providers enable payments to be made through many different convenient methods.

Recently, rapid technological advances in mobile electronic devices such as smartphones and tablet computers have also enhanced the popularity of conducting electronic payments using these mobile electronic devices. Instead of carrying cash or credit cards in a wallet, a consumer may simply use his or her mobile electronic device to conduct the transactions electronically. However, payments conducted by mobile electronic devices may not be feasible when the mobile electronic device is experiencing Internet connectivity problems. Unfortunately, communication outages or disruptions are common problems. Even in industrial countries like the United States, users frequently experience problems accessing the Internet or obtaining service on their mobile device. These problems are even more prevalent in locations that are less technically advanced or have large rural or under-developed areas with sporadic or non-existent cellular service.

Furthermore, though mobile electronic devices have undergone tremendous improvement in terms of processing power, memory storage, or screen resolution, the battery power of these mobile electronic devices still leaves much to be desired. In many cases, a smartphone or a tablet computer can barely last a full day even on moderate usage. Thus, there may be frequent situations where a consumer would like to engage in an electronic transaction in the future, but the remaining battery power of the mobile electronic device likely will not last until the future point in time where the electronic transaction can be conducted.

These problems (e.g., unreliable Internet connectivity and dying battery) may prevent the mobile electronic devices from being fully utilized to engage in electronic transactions. To solve these problems, the present disclosure discloses a system, device, and method of enabling offline transactions to be conducted offline with a mobile electronic device or with a secondary electronic device, in anticipation of these problems discussed above. The various aspects of the present disclosure are discussed in more detail below with reference to FIGS. 1-12.

To provide a context of the present disclosure, FIG. 1 illustrates a block diagram of a networked system or architecture suitable for conducting electronic transactions online, for example, when Internet connectivity exists and when the electronic device (used to conduct transactions) has sufficient battery power. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

The system 100 may include a user device 110, a merchant server 140, a payment provider server 170, an acquirer host 165, an issuer host 168, and a payment network 172 that are in communication with one another over a network 160. Payment provider server 170 may be maintained by a payment service provider, such as PayPal, Inc. of San Jose, Calif. A user 105, such as a consumer, may utilize user device 110 to perform an electronic transaction using payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. Note that transaction, as used herein, refers to any suitable action performed using the user device, including payments, transfer of information, display of information, etc. Although only one merchant server is shown, a plurality of merchant servers may be utilized if the user is purchasing products from multiple merchants.

User device 110, merchant server 140, payment provider server 170, acquirer host 165, issuer host 168, and payment network 172 may each include one or more electronic processors, electronic memories, and other appropriate electronic components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, a smart phone with additional hardware such as NFC (Near Field Communications) chips, BLE hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, make payments, and otherwise utilize a digital wallet through the payment provider as discussed herein.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100. In conjunction with user identifiers 130, user device 110 may also include a secure zone 135 owned or provisioned by the payment service provider with agreement from device manufacturer. The secure zone 135 may also be part of a telecommunications provider SIM that is used to store appropriate software by the payment service provider capable of generating secure industry standard payment credentials as a proxy to user payment credentials based on user 105's credentials/status in the payment providers system/age/risk level and other similar parameters.

User device 110 may install and execute a payment application received from the payment service provider to facilitate payment processes. The payment application may allow a user to send payment transaction requests to the payment service provider. In particular, the payment application may authenticate user 105 before making payments. In an embodiment, the payment application may implement automatic authentication of the user 105 when the user 105 is at certain payment locations. The payment application in conjunction with the payment service provider may also provide proxies for user's credentials and funding instruments (e.g., payment and identity proxies for transaction) within secure zone 135 to be used with/without further authentication with payment service provider depending on the transaction or payment situation. The payment application may also receive relevant payment and identity proxies from proximity based ancillary systems such as a Bluetooth beacon installed in the merchant's premises in association with the payment service provider for the purpose of processing transactions or providing value added services to the user.

Merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be a payment or gift to an individual. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 360 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 may include one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, usernames, phone numbers, credit card information, bank information, or other financial information which may be used to facilitate online transactions by user 105. Account information may also include user purchase history and user ratings. Advantageously, payment application 175 may be configured to interact with merchant server 140 on behalf of user 105 during a transaction with checkout application 155 to track and manage purchases made by users and which and when funding sources are used. In some embodiments, an identity platform may be managed by or be part of a payment provider service, such as payment provider server 170, or be a separate entity or service provider that manages identity.

A transaction processing application 190, which may be part of payment application 175 or separate, may be configured to receive information from a user device and/or merchant server 140 for processing and storage in a payment database 195. Transaction processing application 190 may include one or more applications to process information from user 105 for processing an order and payment using various selected funding instruments, including for initial purchase and payment after purchase as described herein. As such, transaction processing application 190 may store details of an order from individual users, including funding source used, credit options available, etc. Payment application 175 may be further configured to determine the existence of and to manage accounts for user 105, as well as create new accounts if necessary.

In one embodiment, payment provider server 170 may include a token vault storing various information on token formats, conventions, data, and the like. For example, a token may be generated for a user's payment account to allow payment transactions using the token. A user's identity information, preferences, or other information may be stored and associated with the user's account and mapped to tokens. Merchant accounts at the payment provider server 170 also may store merchant's information, such as type of merchant, product or service offered, method of payments, and the like to ensure diversified use of tokens that may vary by merchant type/service etc.

Payment network 172 may be operated by payment card service providers or card associations, such as DISCOVER®, VISA®, MASTERCARD®, AMERICAN EXPRESS®, RuPAY®, China Union Pay®, etc. The payment card service providers may provide services, standards, rules, and/or policies for issuing various payment cards. A network of communication devices, servers, and the like also may be established to relay payment related information among the different parties of a payment transaction.

Issuer host 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at various merchants who agreed to accept the payment card.

Acquirer host 165 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

The system 100 of FIG. 1 works fine when the user device 110 has sufficient battery power and good Internet connectivity. However, when the user device 110 has low battery power or is in a geographical region with poor or no Internet connectivity, offline payments may be needed. According to the various aspects of the present disclosure, offline payments may be performed using either a primary electronic device (e.g., a smartphone or tablet computer implemented as an embodiment of the user device 110 of FIG. 1), or a secondary electronic device (e.g., a wearable electronic device). Examples of the primary electronic device and the secondary electronic device are discussed in more detail with reference to FIG. 2.

Figure 2:
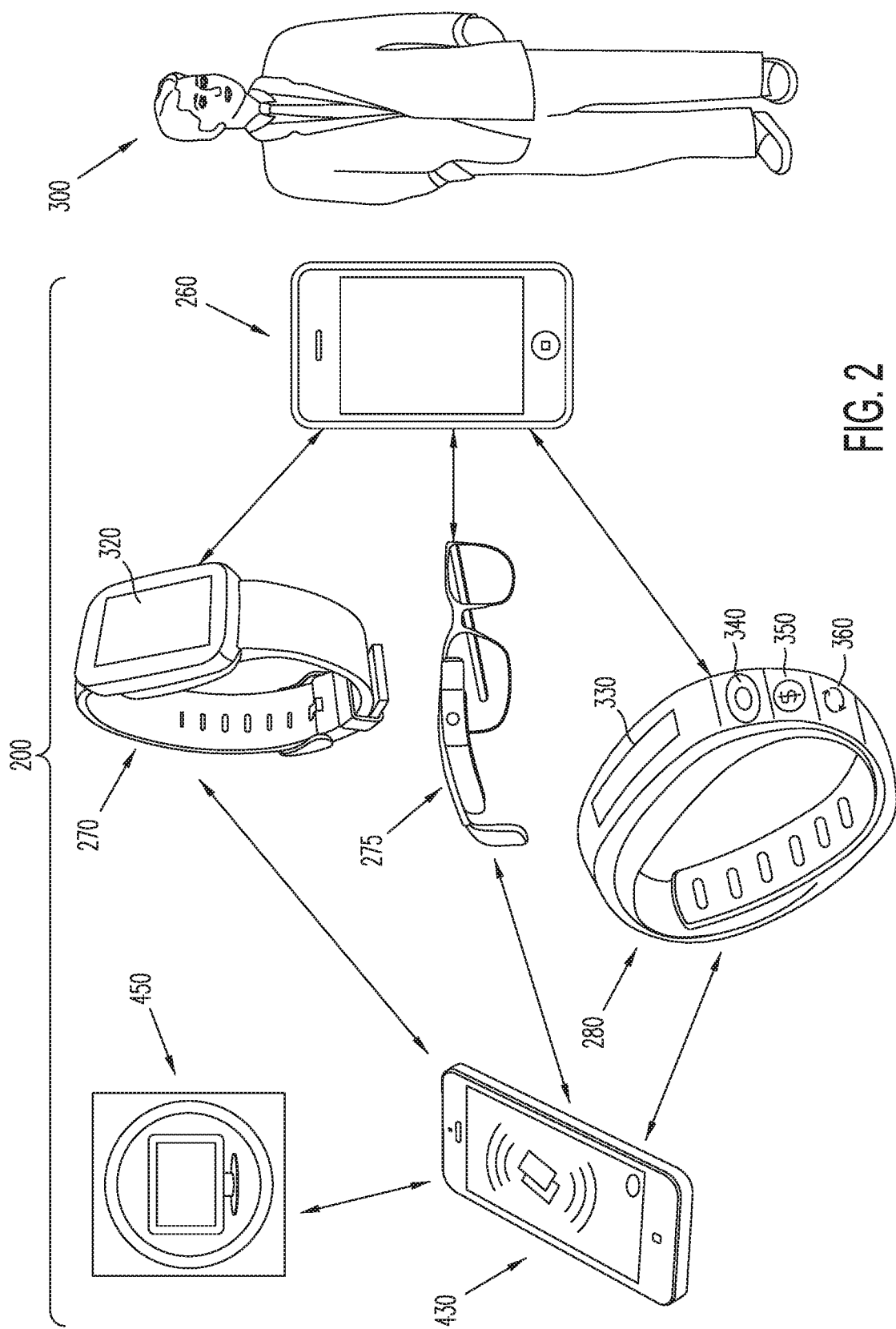
FIG. 2 illustrates a system for conducting offline electronic transactions according to embodiments of the present disclosure.

In more detail, FIG. 2 illustrates an offline payment system 200. The offline payment system 200 includes a primary electronic device 260 and a plurality of secondary electronic devices, for example secondary electronic devices 270, 275, and 280. In various embodiments, the primary electronic device 260 may include a smartphone (e.g., the APPLE IPHONE® or phones powered by operating systems such as ANDROID®, WINDOWS®, BLACKBERRY®, etc.), or a tablet computer (e.g., the APPLE IPAD® or tablets powered by operating systems such as ANDROID®, WINDOWS®, BLACKBERRY®, etc.). The primary electronic device 260 may have a touchscreen graphical user interface. A user 300 may interact with the primary electronic device 260 through the touchscreen graphical user interface.

The secondary electronic devices 270, 275, and 280 include wearable electronic devices. Wearable electronic devices have been introduced commercially at least in part to address the portability and battery limitations of smartphones and tablet computers. For instance, smartwatches (SAMSUNG GEAR®), head-mounted displays (e.g., GOOGLE GLASS®), or smart fitness bands (e.g., FITBIT®) are example types of wearable electronic devices. Due to their small sizes, a wearable electronic device can be easily worn by its user for a long period of time without causing discomfort for the user. In many cases, the wearable electronic device can also last relatively long (e.g., longer than a smartphone or tablet computer) on a single charge due to their infrequent usage and less power-hungry components. The wearable electronic device are typically communicatively coupled (e.g., "tethered") to its user's smartphone or tablet computer, in this case, the primary electronic device 260.

In the embodiment shown in FIG. 2, the secondary electronic device 270 is a smartwatch (e.g., SAMSUNG GEAR® or the APPLE WATCH®), the secondary electronic device 275 is a head-mounted display (e.g., GOOGLE GLASS®), and the secondary electronic device 280 is a fitness band (e.g., FITBIT®). These secondary electronic devices 270-280 each have a radio component that includes a transceiver or a receiver and a transmitter. The radio component may include a Wi-Fi chip, a Bluetooth chip, an NFC (Near Field Communications) chip, or a chip that has two or more of these functionalities integrated therein. Via their respective radio components, the secondary electronic devices 270-280 may establish wireless or wired communications links with the primary electronic device 260 and conduct telecommunications with the primary electronic device 260 accordingly. In that sense, the secondary electronic devices 270-280 may each be "tethered" to the primary electronic device 260. As such, the primary electronic device 260 may be able to push or forward electronic messages to one or more of the secondary electronic devices 270-280. According to the various aspects of the present disclosure, the tethering also allows the primary electronic device 260 to load funds electronically to one or more of the secondary electronic devices 270-280.

The secondary electronic devices 270-280 each have their own communication interfaces. For example, the secondary electronic device 270 includes a display screen 320 as a part of its communications interface, the secondary electronic device 275 includes a virtual display (not illustrated herein) as a part of its communications interface, and the secondary electronic device 280 includes a display screen 330 as a part of its communications interface. The display screens 320 and 330 may include a liquid crystal display (LCD)-based screen or a light-emitting diode (LED)-based screen. The LCD-based or LED-based screen may also be touch-sensitive (e.g., commonly referred to as touchscreen devices) and responds to touches from a finger of a user or a stylus.

Apart from the display screens 320 and 330, the secondary electronic devices 270-280 may further includes a plurality of buttons as a part of their communications interfaces. For example, in the embodiment illustrated in FIG. 2, the secondary electronic device 280 includes buttons 340, 350, and 360. The button 340 is an "on/off" button 340 that can be pressed by the user 300 to turn on or off the secondary electronic device 280. The button 340 may display a green color in the "on" state and may display a red color in the "off" state, though other colors are possible in alternative embodiments. The button 350 is a balance button 350 that displays the available amount of offline balance (e.g., amount of funds that can be used to conduct transactions) available. The button 360 is a sync button 360 that can be used to synchronize with the primary electronic device 260 for top up of offline balance. It is understood that the buttons 340, 350, and 360 may also be implemented on the secondary electronic devices 270 and 275 in some alternative embodiments, or that their functionalities may be integrated within the displays 320 and 330 in some other alternative embodiments.

In various embodiments, the secondary electronic devices 270-280 may be powered by a battery or even by solar exposure. Due to their simpler functionality (which requires less processing power), smaller screen sizes, and infrequent usage, the battery of the secondary electronic devices 270-280 typically lasts significantly longer than the primary electronic device 260. Therefore, according to some embodiments of the present disclosure, the secondary electronic devices 270-280 may be used to engage in offline payments in lieu of the primary electronic device 260 when the primary electronic device 260 is running low on battery power.

Figure 3:
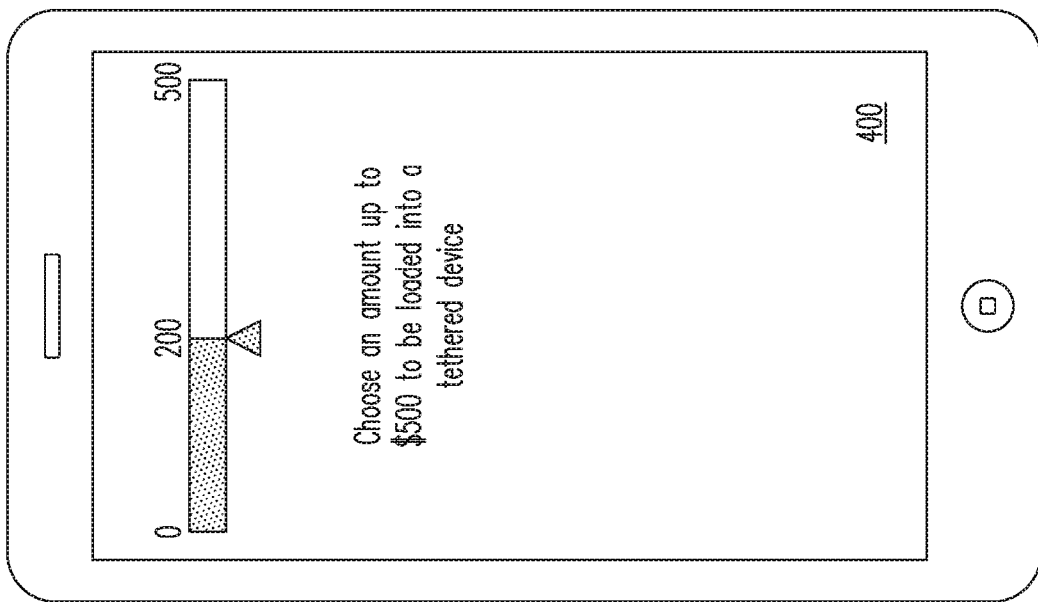
FIGS. 3-4 and 7-8 illustrate example user interfaces of an electronic device used to conduct offline electronic transactions according to embodiments of the present disclosure.

For example, referring to FIG. 3, the primary electronic device 260 monitors its battery level, for example by periodically querying percentage of battery power remaining. When the battery level drops below a predetermined threshold, the primary electronic device 260 may initiate an offline payment task. In some embodiments, the predetermined threshold corresponds to a battery percentage remaining, for example 10% or 5%. In some embodiments, a user of the primary electronic device can specify this threshold. For example, the user may specify that at a battery level of 15%, the primary electronic device 260 should initiate the offline payment task. In some other embodiments, the predetermined threshold corresponds to an estimated amount of time remaining based on the current usage condition of the primary electronic device 260, for example 10 minutes remaining or five minutes remaining. The primary electronic device 260 may calculate a battery drain rate, and based on that, calculate the estimated amount of time the primary electronic device 260 is expected to last. For example, the primary electronic device 260 may determine that from when the battery was full (100%) and the present (50%), 5 hours have passed. In other words, 5 hours of time for the primary electronic device 260 (including both active use and inactive use) translates into 50% of the battery. Thus, it may be calculated that the battery drains 10% for every hour (or 1% for every 6 minutes). This calculated battery drain rate may be continuously or periodically updated as well. For example, supposed that after 1 hour of use, the battery drained 10%. Thus, the calculated battery drain rate at that time is 1% per 6 minutes. After 2 hours of use (i.e., after another hour has passed), the battery has drained a total of 40%. Thus, the calculated battery drain rate is updated to be 1% per 3 minutes. Based on the most recently calculated battery drain rate, the primary electronic device 260 may then project when the threshold with respect to time will be reached. For example, if the battery drain rate is 1% per 3 minutes, and the user has specified that the offline payment task should be invoked when the primary electronic device 260 is estimated to last about 15 minutes, then the primary electronic device 260 may calculate that it will only have about 15 minutes of remaining time when its battery reaches 5%. Accordingly, the primary electronic device 260 triggers the offline payment task when the battery reaches 5%.

Regardless of how the predetermined threshold is determined, once the battery level reaches that point, the primary electronic device 260 may display, via a touchscreen graphical user interface 400, a message to the user asking whether the user would like to activate offline payment. For example, the message may read "Your phone's battery is about to run out. Would you like to load money into a tethered device for offline payment?" The touchscreen graphical user interface 400 may also display an "Agree" button and a "Decline" button for the user to select. If the user presses the "Decline" button, no offline payment will be performed. However, if the user presses the "Agree" button, the primary electronic device 260 may initiate the loading of some money or funds into one of the secondary electronic devices 270-280. According to some embodiments of the present disclosure, the funds used for offline payments may be loaded from the user's account with third-party payment provider 170 discussed above with reference to FIG. 1.

Figure 4:
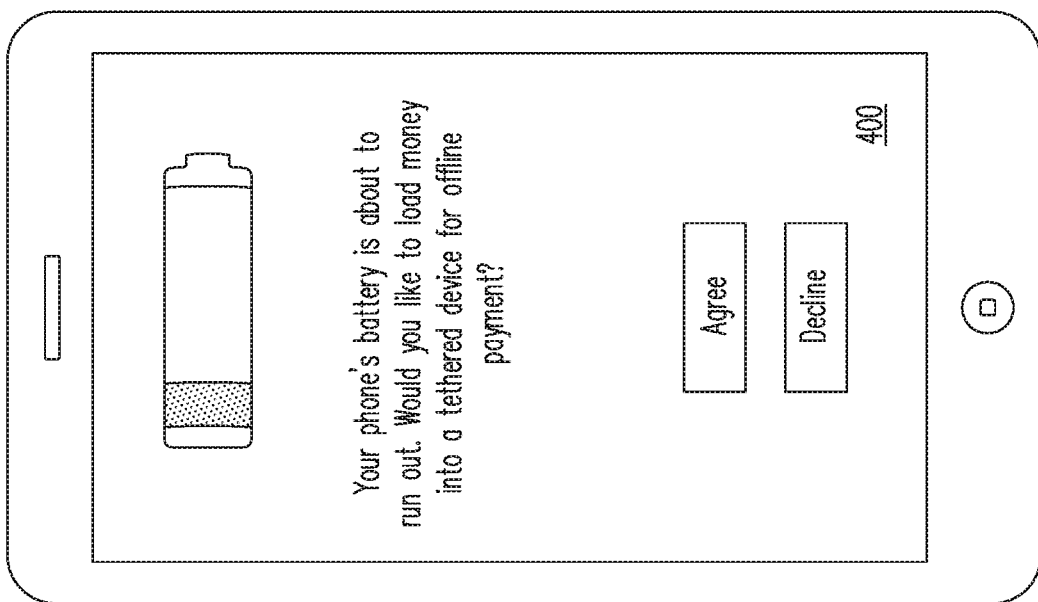

Referring now to FIG. 4, the graphical user interface 400 may display a message to let the user know that he/she may load a certain amount of money to a secondary electronic device. For example, the message may read "choose an amount up to $500 to be loaded into a tethered device." The graphical user interface 400 may also display a virtual slider that allows a user to select the exact amount of money (up to $500) to be loaded into one of the secondary electronic devices 270-280. In this example, the $500 represents an offline payment limit or cap that may be dynamically determined for each individual user.

In some embodiments, the offline payment limit or cap is determined based on the user's standing with the third party payment provider 170. For example, a more valuable user or a user who has a good credit history may be assigned a higher offline payment limit, whereas a less valuable user or a user who has poor credit history may be assigned a lower offline payment limit (or none at all).

The user's previous transactions may also be used to calculate the offline payment limit. In some embodiments, the third party payment provider 170 may retrieve the last X number (e.g., 10) of transactions, including transaction details such as the amount of each of these transactions. The third party payment provider 170 may then calculate the offline payment limit as a function of the previous transactions. For example, the offline payment limit may be calculated as an average (or 75%, or 25%, or another suitable number) of the transaction amount for the previous X number of transactions.

If a target merchant for conducting the offline transaction is known, the merchant's track record may also be used to calculate the offline payment limit. In some embodiments, the third party payment provider 170 may retrieve the merchant's previous transactions that had disputes. If the merchant is associated with a greater than average number of disputes compared to other merchants, or if an amount in dispute was particularly high, then the merchant may be deemed a high risk merchant, and the third party payment provider 170 may assign a lower offline payment limit for any transactions conducted with that merchant. On the other hand, if the merchant is associated with a fewer than average number of disputes compared to other merchants, or if the amounts in dispute were particularly low, then the merchant may be deemed a low risk merchant, and the third party payment provider 170 may assign a higher offline payment limit for any transactions conducted with the merchant. In some embodiments, the third party payment provider 170 may also calculate the offline payment limit as a function of the previous X number of transactions conducted with the merchant. For example, the offline payment limit may be calculated as an average (or 75%, or 25%, or another suitable number) of the transaction amount for the previous X number of transactions.

In other embodiments, the geographical location (e.g., determined by GPS sensors of the primary electronic device 260) of the primary electronic device 260 may also be used to determine the offline payment limit. For example, if the primary electronic device 260 is in a country A, it may be assigned a greater offline payment limit than if it was in a country B. The same may be true for a particular state, province, county, city, neighborhood, or any geo-fenced area. In some other embodiments, the type of account the user has with the third party payment provider 170 may also factor into the determination of the offline payment limit. For example, a user with a business account may be given a higher offline payment limit than a user with a personal account. It is also understood that in some embodiments, rather than giving the user a choice, the third party payment provider 170 may automatically set the amount of offline funds to be loaded into a secondary electronic device.

In any case, when offline payment is activated in response to detecting a low battery situation of the primary electronic device 260, the primary electronic device may send a request to the third party payment provider 170 to load funds to one of the tethered secondary electronic devices 270-280 for offline payment. Alternatively, the primary electronic device 260 may load funds (funds that are locally available on the primary electronic device) directly into one of the tethered secondary electronic devices 270-280. In either scenario, the loading may be handled by a mobile app of the third party payment provider 170 installed on the primary electronic device 260. For the funds to be successfully loaded into one of the secondary electronic devices 270-280, the secondary electronic device needs to be Wi-Fi-enabled or Bluetooth-enabled. Via a Wi-Fi hotspot or a Bluetooth-enabled hotspot, the secondary electronic device 270/275/280 syncs up user instructions with the primary electronic device 260, and as a result, the secondary electronic device 270/275/280 gets updated with the offline payment amount. At this point, the funds are electronically transferred to the secondary electronic device 270/275/280, which is then ready to be used to conduct electronic transactions offline.

Referring back to FIG. 2, the offline payment system 200 also includes a payment device reader 430. The payment device reader 430 may include an NFC chip or a Bluetooth chip. As such, the secondary electronic device 270/275/280 may establish a communications link with the payment device reader 430 via NFC (e.g., an NFC bump) or via Bluetooth (e.g., a Bluetooth pairing). The payment device reader 430 requests information from the secondary electronic device 270/275/280, such as account details (e.g., account number), current offline balance (e.g., funds that were just electronically loaded into the secondary electronic device), and/or past transaction details (e.g., amount, date/time, previous merchant). The secondary electronic device 270/275/280 provides the requested information to the payment device reader 430. The payment device reader 430 then routes the information to a billing system server 450 of a merchant with which the transaction is conducted. The merchant may view the supplied information via the billing system server, and if the information is satisfactory, the merchant debits the amount of the transaction from the secondary electronic device 270/275/280 via the billing system server 450. Thereafter, the offline balance is updated on the secondary electronic device 270/275/280, as are the transaction amount, transaction data/time and the merchant details. For example, in the case of NFC-enabled offline payments, the transaction details discussed above may be written back to the secondary electronic device via an NFC chip. In the case of Bluetooth-enabled offline payments, the transaction details may be written back to the secondary electronic device via a Bluetooth chip.

As an example, suppose the user wishes to purchase an item at Macy's, and the amount of the item is $100. The billing system server 450 may retrieve and/or display the following details from the secondary electronic device 270/275/280 via the device reader 430:

PayPal Account Number: 123456789
Device ID: 123XYZ
Available Offline Balance: $125
Last Sync Offline Balance: $150 Aug. 15, 2015, 10:10:10 PST
List of Transactions since Last Sync:
1. Wendy's $25 August 15, 10:20:00 PST
Current Amount Due at Macy's: $100
Payment Mode: Offline Balance These transaction details are before the offline transaction is conducted. After the offline transaction is conducted at Macy's using the secondary electronic device 270/275/280, the billing system server 450 may update the following details to the secondary electronic device 270/275/280 via the device reader 430:

PayPal Account Number: 123456789
Device ID: 123XYZ
Available Offline Balance: $25
Last Sync Offline Balance: $150 Aug. 15, 2015, 10:10:10 PST
List of Transactions since Last Sync:
1. Wendy's $25 August 15, 10:20:00 PST
2. Macy's $100 August 15, 10:25:00 PST
Transaction Status: Success—Pending Settlement
Payment Mode: Offline Balance In some embodiments, after the offline transaction is completed using the secondary electronic device 270/275/280, the remaining offline funds (if any) may be refunded back to the primary electronic device 260 upon a reestablishing of a communications link with the primary electronic device 260 (e.g., when the primary electronic device 260 is charged up and resumes tethering with the secondary electronic device), or the remaining offline funds may be refunded back into the account of the user via the server of the third party payment provider 170.

In some embodiments, the communication interface of the secondary electronic device 270/275/280 is updated at various stages of the offline payment. For example, the on/off button 340 may display a first color (e.g., red) when it is first turned on but before any offline funds are loaded into the secondary electronic device 340. The on/off button 340 may display a second color (e.g., yellow) in response to the offline funds being loaded into the secondary electronic device 280. The on/off button 340 may display a third color (e.g., green) when the offline transaction has been successfully completed using the secondary electronic device 280. As another example, the offline balance button 350 may display a numerical number that corresponds to the amount of offline funds available on the secondary electronic device 280. This number is updated (e.g., increases) as more funds are loaded into the secondary electronic device 280, and it is also updated (e.g., decreases) as the offline transaction is conducted using the funds.

It is understood that the display screens 320 and 330 may also undergo various visual changes to correspond to the different steps of the offline transaction. For example, the display screens 320 and 330 may display text (or graphical animations) or play audio to the user 300 to let the user 300 know what is happening with the offline transaction (e.g., funds being loaded into the secondary electronic device, transaction being conducted, transaction successfully completed, etc.).

Figure 5A:
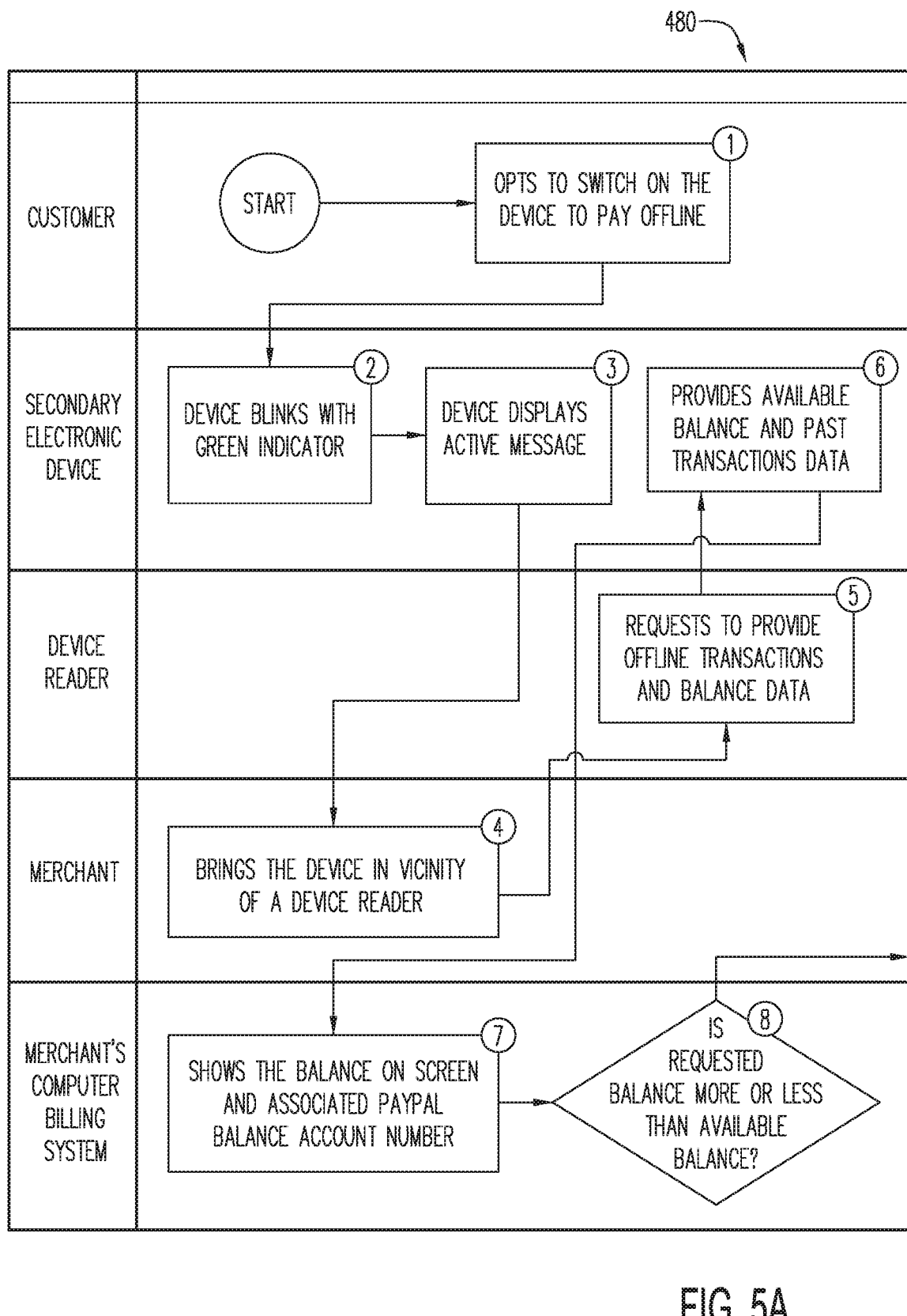
FIGS. 5A and 5B, is a graph illustrating the various steps of conducting offline electronic transactions according to embodiments of the present disclosure.
Figure 5B:
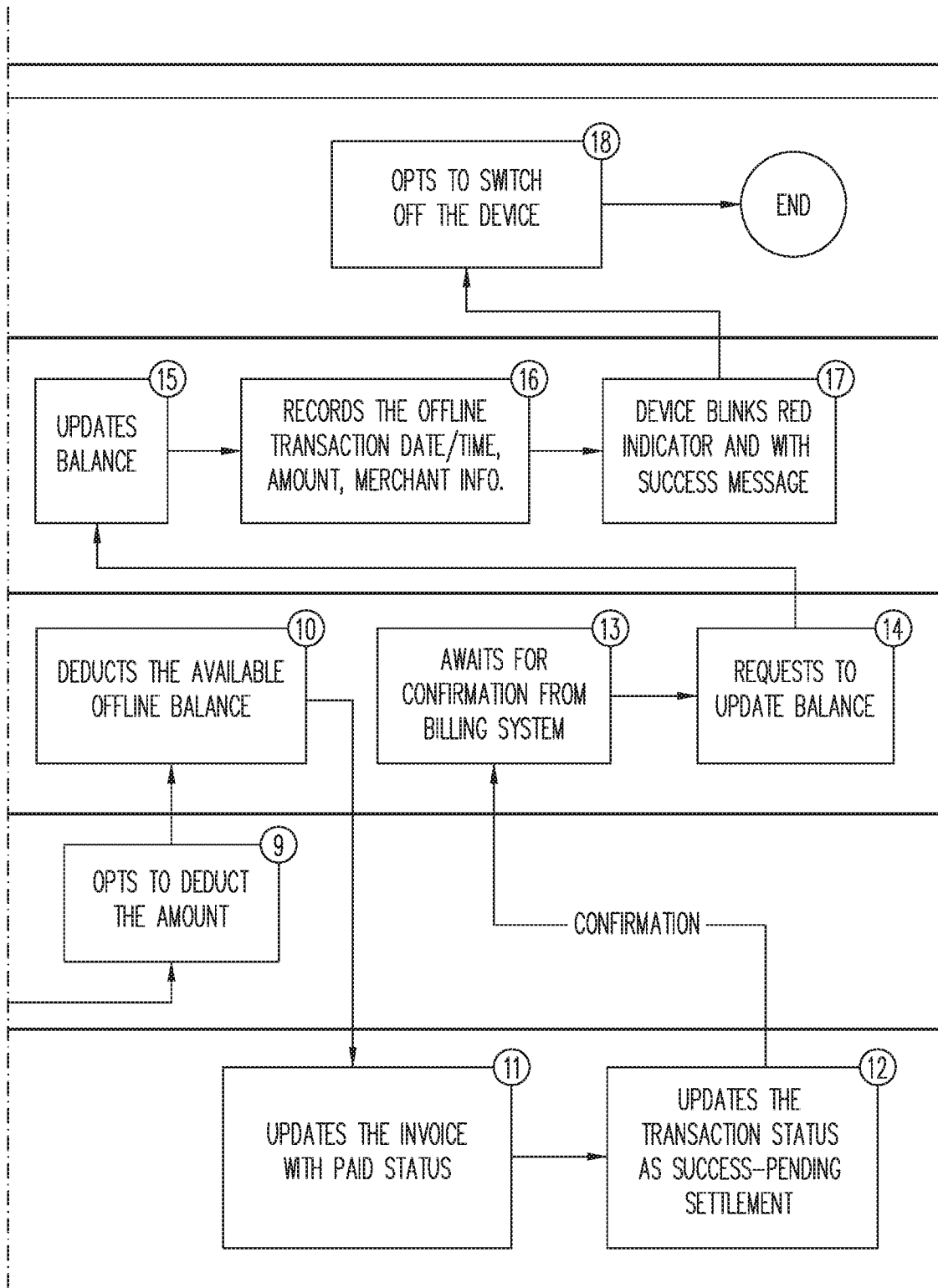

FIG. 5, which has been split up into FIGS. 5A and 5B, illustrates a more detailed flow graph 480 of the various steps of offline payments using a secondary electronic device according to an embodiment of the present disclosure. The graph 480 includes a plurality of rows, each row corresponding to actions performed by a respective entity in the offline payment scheme discussed herein.

At step 1, the customer (e.g., the user 300 of FIG. 2) opts to switch on the secondary electronic device (e.g., one of the secondary electronic devices 270/275/280) to pay offline. At step 2, the secondary electronic device may blink with a green indicator to indicate that it is turned on and ready to make offline payments. At step 3, the secondary electronic device may display an active message. At step 4, the merchant brings the secondary electronic device in the vicinity of a device reader, (e.g., the device reader 30 discussed above with reference to FIG. 2). At step 5, the device reader makes a request to the secondary electronic device to provide offline transactions information and balance data. At step 6, the secondary electronic device provides available balance and past transactions data. At step 7, the merchant's computer billing system (e.g., the billing system 450 discussed above reference to FIG. 2) shows the balance on its screen and the associated PayPal (an example of a third party payment provider) balance account number of the customer. At step 8, the merchant's computer billing system makes a determination as to whether the requested balance is more or less than the available balance on the secondary electronic device. At step 9, the merchant ops to deduct the amount of the transaction, and at step 10, the device reader deducts the available offline balance. At step 11, the merchant's computer billing system updates the invoice with a paid status. At step 12, the merchant's computer billing system updates the transaction status as success-pending settlement. At step 13, the device reader awaits for confirmation from the billing system. At step 14, the device reader requests to update the balance. At step 15, the secondary electronic device updates the balance. At step 16, the secondary electronic device records the offline transaction date, time, amount, and merchant information. At step 17, the secondary electronic device blinks with a red indicator and with a success message. At step 18, the customer opts to switch off the secondary electronic device.

The discussions above pertain to using a secondary electronic device to conduct offline payments in response to detecting a low battery status of a primary electronic device. According to various aspects of the present disclosure, offline transactions may also be conducted when it is anticipated that the primary electronic device will experience unreliable Internet connectivity soon. For the purposes of the present disclosure, unreliable Interconnectivity may refer to either a nonexistent Internet connection in some embodiments, or an Internet connection speed that is slow beyond a predetermined threshold (e.g., slower than M kilo-bits per second, where M may be 28 or 14, or another number between 1 and 1000) in other embodiments, or an Internet connection that is frequently interrupted (e.g., more than N number of interruptions per hour, where N may be 10 or 20, or another number between 1 and 100) in yet other embodiments, or combinations thereof.

Figure 6:
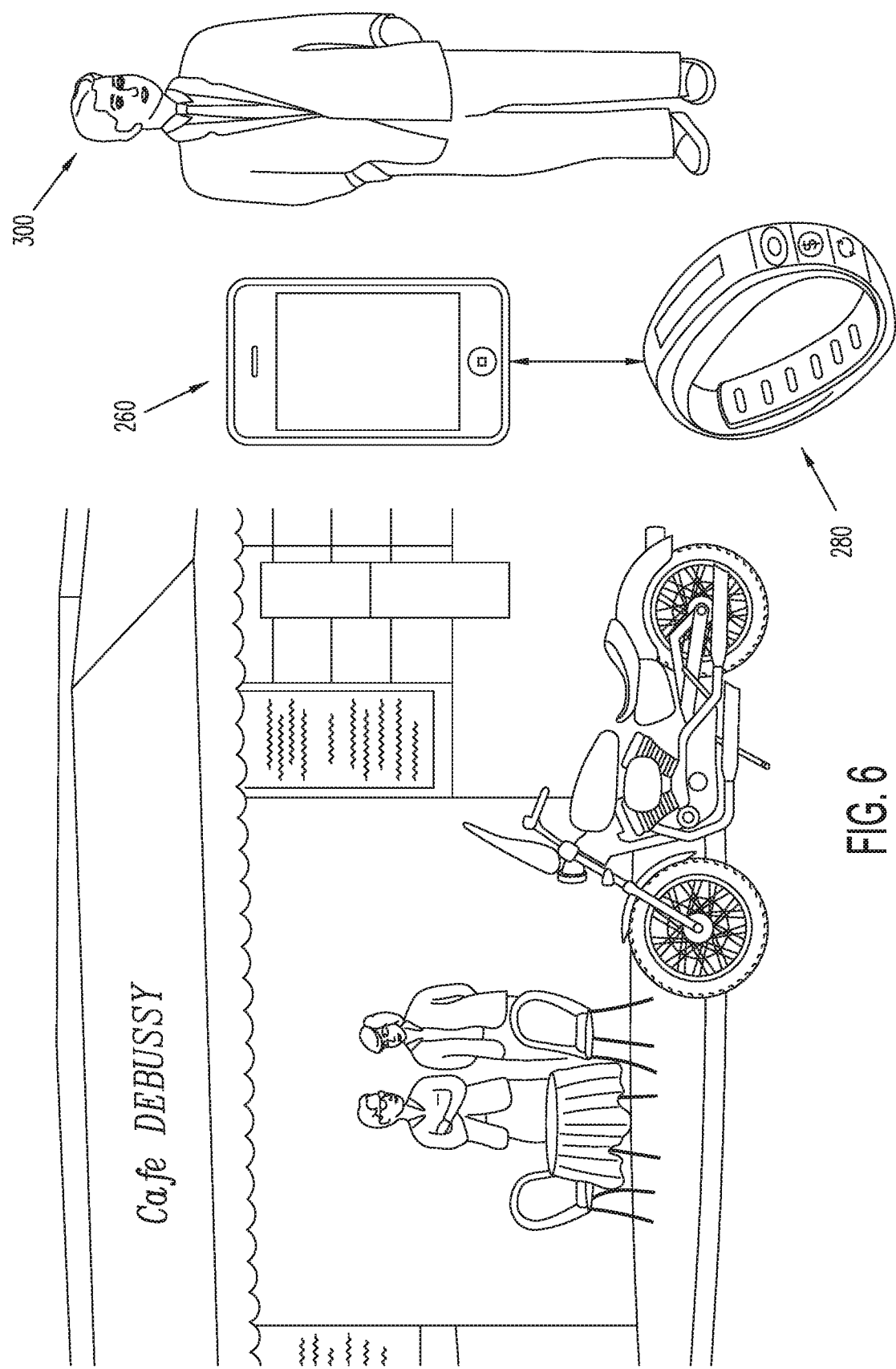
FIG. 6 illustrates an example environment for conducting offline electronic transactions according to embodiments of the present disclosure.

For example, referring now to FIG. 6, the user 300 is about to walk into a restaurant "Café Debussy." Based on the user's previous experiences, the restaurant "Café Debussy" is a place where the user 300's primary electronic device 260 is likely to have little to no Internet connectivity. In other words, the restaurant "Café Debussy" may be a "dead zone" for the primary electronic device 260. This may be attributed to the fact that no cellular tower of a cellular service provider of the primary electronic device 260 is located within proximity of the restaurant, or that the structural surroundings and devices at or near the restaurant cause strong interference with the cellular service of the primary electronic device 260, and/or the restaurant provides no Wi-Fi service (or that the user prefers not to use any Wi-Fi service provided by the restaurant).

In some embodiments, the determination that the user 300 is about to go into a zone with unreliable Internet connectivity is performed as follows: the primary electronic device 260 has a radio that includes a transceiver (or transmitter/receiver) component. The transceiver component may periodically send and/or receive wireless service signals to and/or from a cellular tower. Based on the strength of the wireless service signal (or the lack thereof), the primary electronic device 260 may determine whether or not Internet connectivity exists for the primary electronic device.

If the primary electronic device 260 determines that Internet connectivity no longer exists, or that it is very spotty (e.g., frequent interruptions in Internet service) or weak (strength of the service signal below a predetermined threshold), then the primary electronic device 260 may mark the current geographical region as a zone where Internet connectivity is unreliable. This may be done by Global Positioning System (GPS) sensors implemented on the primary electronic device. The primary electronic device may record the GPS coordinates of the area corresponding to the unreliable Internet connectivity. For example, the GPS coordinates may be something like "longitude 96.8175, latitude 33.3524". The primary electronic device 260 designates the location corresponding to these GPS coordinates as a geographical zone with unreliability Internet connectivity. In some embodiments, the primary electronic device 260 may even mark an area within a certain radius (e.g., 50 meters) of the recorded GPS coordinates as an area of unreliable Internet connectivity. In some other embodiments, the user 300 may use the primary electronic device 260 to "check-in" to a venue (e.g., the restaurant "Café Debussy") via social media. If the primary electronic device 260 subsequently experiences any Internet connectivity problems while the user 300 is checked-in to the venue, the user 300 may designate the venue as a venue with unreliable Internet connectivity.

In some embodiments, the primary electronic device 260 (and the primary electronic devices of other users) may also send the information regarding the unreliable Internet connectivity (e.g., GPS coordinates or names of venues) to a remote electronic database of the third party payment provider 170 to be stored. Over time, the third party payment provider 170 may build up a comprehensive database that includes the various geographical zones having unreliable Internet connectivity for mobile electronic devices. These geographical zones having unreliable Internet connectivity may also be grouped by the cellular service provider, since a device with a first cellular service provider (e.g., AT&T) may experience unreliable Internet connectivity while another device with a second cellular service provider (e.g., Verizon) may not. The third party payment provider may also communicate the list of geographical zones with unreliable Internet connectivity (which may be pre-filtered based on the specific cellular service provider) to the primary electronic device 260 (or other similar devices), so that the primary electronic device 260 may be constantly updated as to what areas of town may have poor Internet connectivity.

Based on the above discussions, it can be seen that the primary electronic device 260 may "know" what areas/zones or venues are likely to cause a loss or a weakening of Internet connectivity to the primary electronic device 260, even before the primary electronic device 260 arrives at these zones or venues. The app of the third party payment provider 170 may continuously or periodically (e.g. once every minute) monitor the present location of the primary electronic device 260, for example by retrieving its current GPS coordinates. Based on the current GPS coordinates, and based on the movement trajectory of the primary electronic device 260, the app may estimate that the primary electronic device 260 (and its user 300) is likely to go into one of the zones or venues having unreliable Internet connectivity soon, which in this case is the restaurant "Café Debussy". In response to this estimation, the app may activate offline payment, so that the user 300 may conduct offline transaction at "Café Debussy" even though Internet connectivity is nonexistent or very poor at this establishment.

In some embodiments, the offline payment is performed using a secondary electronic device (e.g., the device 280) tethered to the primary electronic device 260, in a manner similar to that discussed above with reference to FIGS. 2-5. In other embodiments, the offline payment may be performed using the primary electronic device 260 itself. For example, the app of the third party payment provider 170 may transfer a predetermined amount of money to be available locally on the primary electronic device 260. The offline funds information may be written into an electronic chip (e.g., an NFC chip) on the primary electronic device 260. Of course, the method to determine the amount of funds available for offline payment on the secondary electronic device may be similar to that discussed above with reference to FIGS. 3-4. It is understood that the amount of funds loaded into the primary electronic device for offline transactions may be different from the amount of funds loaded into the secondary electronic device for offline transactions. For example, an X amount of money may be loaded into the primary electronic device for offline transactions, while a Y amount of money may be loaded into the secondary electronic device for offline transactions.

Figure 7:
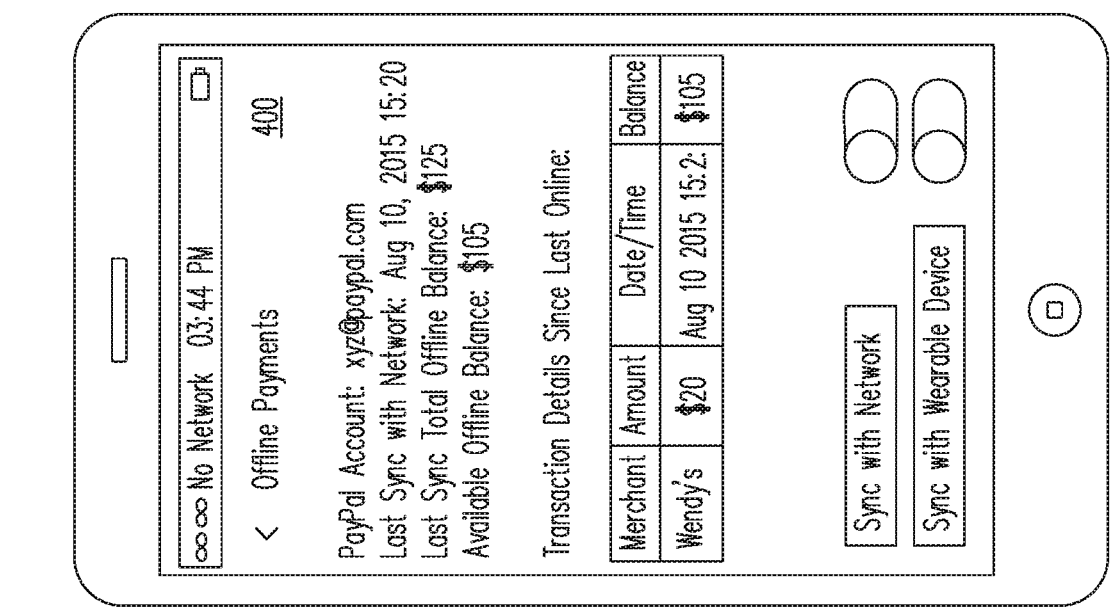
Figure 8:
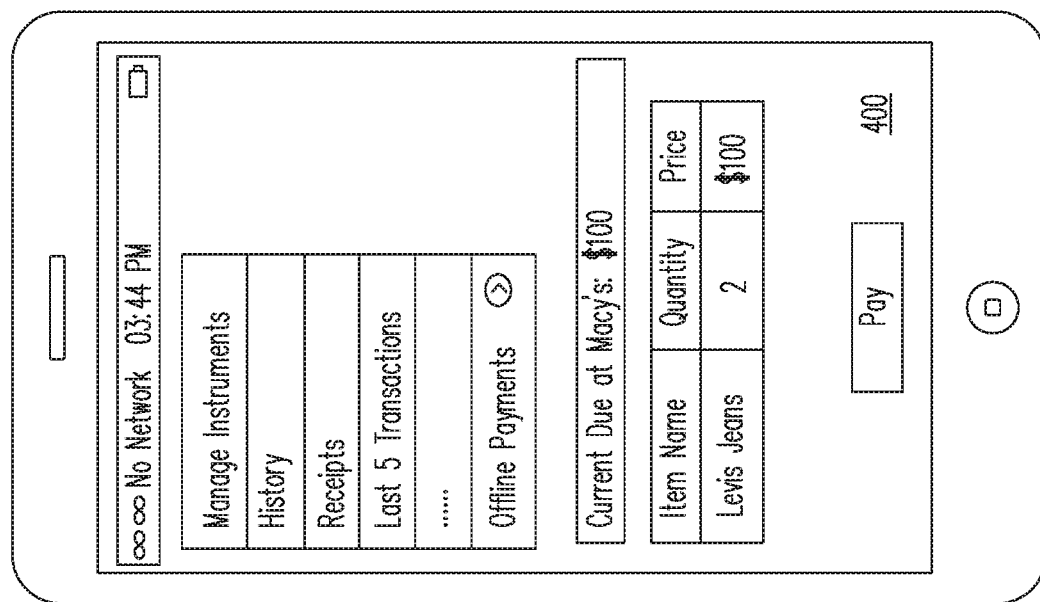

FIGS. 7-8 illustrate example screenshots of the user interface 400 of the primary electronic device 260, while it is being used to conduct offline transactions via the app of the third party payment provider 170. As shown in FIG. 7, the primary electronic device 260 does not detect a network—meaning no Internet connectivity exists. Via the app, the user may perform tasks such as manage instruments, view history of payments, view receipts, view the last X (e.g., 5) of transactions, and perform offline payments. The current amount due is displayed (e.g., $100), and the item name and quantity (e.g., 2 pairs of Levis Jeans) are also displayed. When the user clicks on the "Pay" button, offline payment transaction may be initiated using the primary electronic device (e.g., via NFC-enabled or Bluetooth-enabled technologies) and the device reader 430 of FIG. 2.

If the user clicks on "Offline Payments", then the offline payment details are displayed in FIG. 8, such as the user's account information with the third party payment provider, last sync time, last sync offline balance, available offline balance, transaction details since last online, etc. The user may also click on the "Sync with Network" button to sync up with the third party payment provider, or click on the "Sync with Wearable Device" button to sync up with one of the tethered secondary electronic devices. As is the case with offline payments using the secondary electronic device, once the offline transaction is successfully completed using the primary electronic device 260, the transaction details may be written back into an NFC chip or a Bluetooth chip of the primary electronic device 260 as well.

In some embodiments, in response to the primary electronic device 260 detecting that it is about to go into a geographical zone or a venue with unreliable Internet connectivity, it may communicate an alert to the user. For example, the primary electronic device 260 may play an audio signal (e.g., a ding or a chime), or vibrate itself, or display a visual graphic or animation on the user interface 400, so as to inform the user that he/she is about to approach an area with little to no Internet coverage. This may give the user an opportunity to initiate the offline payment, for example by launching the app of the third party payment provider on the primary electronic device 260 to load some funds into the primary electronic device 260 or to one of the secondary devices offline. Similarly, in the embodiment disclosed above in association with a low battery situation, the primary electronic device 260 may also communicate a similar alert to the user, so that the user may also have time to initiate offline payment. Of course, in other embodiments, the offline payment discussed above may be automatically initiated in response to detecting a low battery situation, or in response to detecting that the user is about to go into an area with unreliable Internet connectivity.

Figure 9:
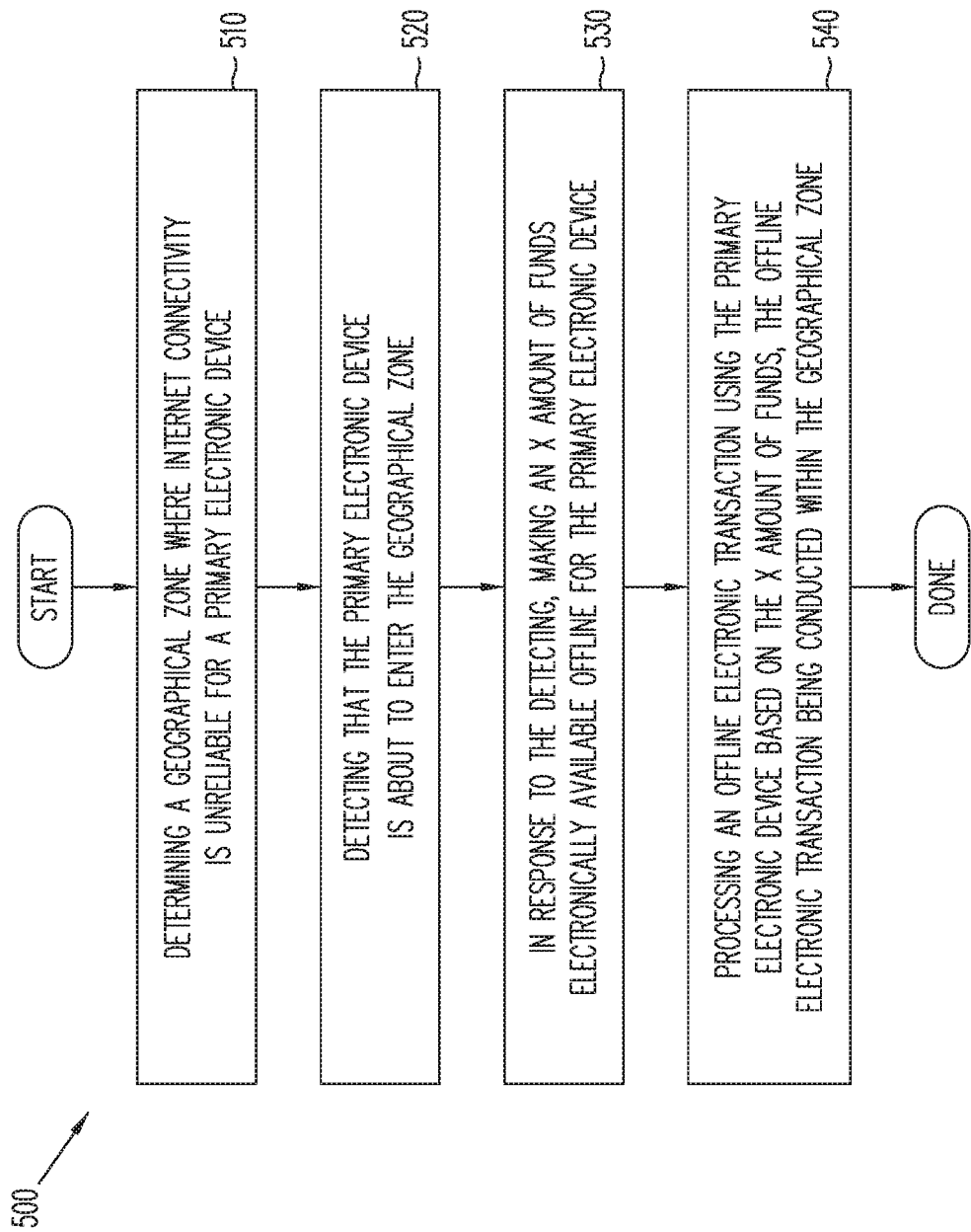
FIGS. 9-10 are flowcharts illustrating different methods of conducting offline electronic transactions according to embodiments of the present disclosure.

FIG. 9 is a flowchart illustrating a method 500 of engaging in an offline electronic transaction. The method 500 includes a step 510 of determining a geographical zone where Internet connectivity is unreliable for a primary electronic device. The primary electronic device may be a smartphone or a tablet computer. In some embodiments, the primary electronic device includes a radio component and a Global Positioning System (GPS) component. In some embodiments, the step 510 includes the following steps: the Internet connectivity of the primary electronic device is monitored at least in part via the radio component. In response to a loss of the interconnectivity or a weakening of the interconnectivity beyond a predetermined threshold, GPS coordinates of a geographical location corresponding to the loss or the weakening of the interconnectivity are recorded. A zone within a predetermined range of the recorded GPS coordinates is designated as the geographical zone having unreliable Internet connectivity. In some embodiments, a weakening of the Internet connectivity may refer to a decrease in Internet signal strength, or a drop in Internet connection speed, or an increase in the number of interruptions in the Internet connection.

In some other embodiments, the step 510 includes: designating a venue as the geographical zone having unreliable Internet connectivity based on feedback from a user of the primary electronic device.

In some other embodiments, the step 520 includes: retrieving, from a remote electronic database, a plurality of geographical zones that have been confirmed to have unreliable Internet connectivity based on input from one or more additional electronic devices.

The method 500 includes a step 520 of detecting that the primary electronic device is about to enter the geographical zone. This detection may be performed based on the current GPS coordinates of the primary electronic device and also based on the projected movement trajectory of the primary electronic device.

The method 500 includes a step 530 of, in response to the detecting, making an X amount of funds electronically available offline for the primary electronic device.

The method 500 includes a step 540 of processing an offline electronic transaction using the primary electronic device based on the X amount of funds. The offline electronic transaction is engaged within the geographical zone, in spite of the unreliable Internet connectivity.

It is understood that at least some of the steps 510-540 are performed at least in part by an app installed on the primary electronic device, or at least in part by one or more electronic processors of a system that is located remotely from the primary electronic device. It is also understood that additional method steps may be performed before, during, or after the steps 510-540 discussed above. For example, in some embodiments, the method 500 further includes a step of communicating an alert to a user of the primary electronic device in response to the detecting that the primary electronic device is about to enter the geographical zone and before making the X amount of funds to the primary electronic device.

As another example, the method 500 may further include a step of: loading a Y amount of funds electronically to a secondary electronic device for offline purchases. The secondary electronic device is a wearable electronic device and is communicatively coupled to the primary electronic device. Within the geographical zone, the offline electronic transaction is engaged using the secondary electronic device based on the Y amount of funds. In some embodiments, the secondary electronic device includes a communications interface, and the loading of the Y amount of funds electronically to the secondary electronic device is accompanied by updating the communications interface to indicate funds being loaded to the secondary electronic device.

It is also understood that one or more of the steps of the method 500 described herein may be omitted, combined, or performed in a different sequence as desired.

Figure 10:
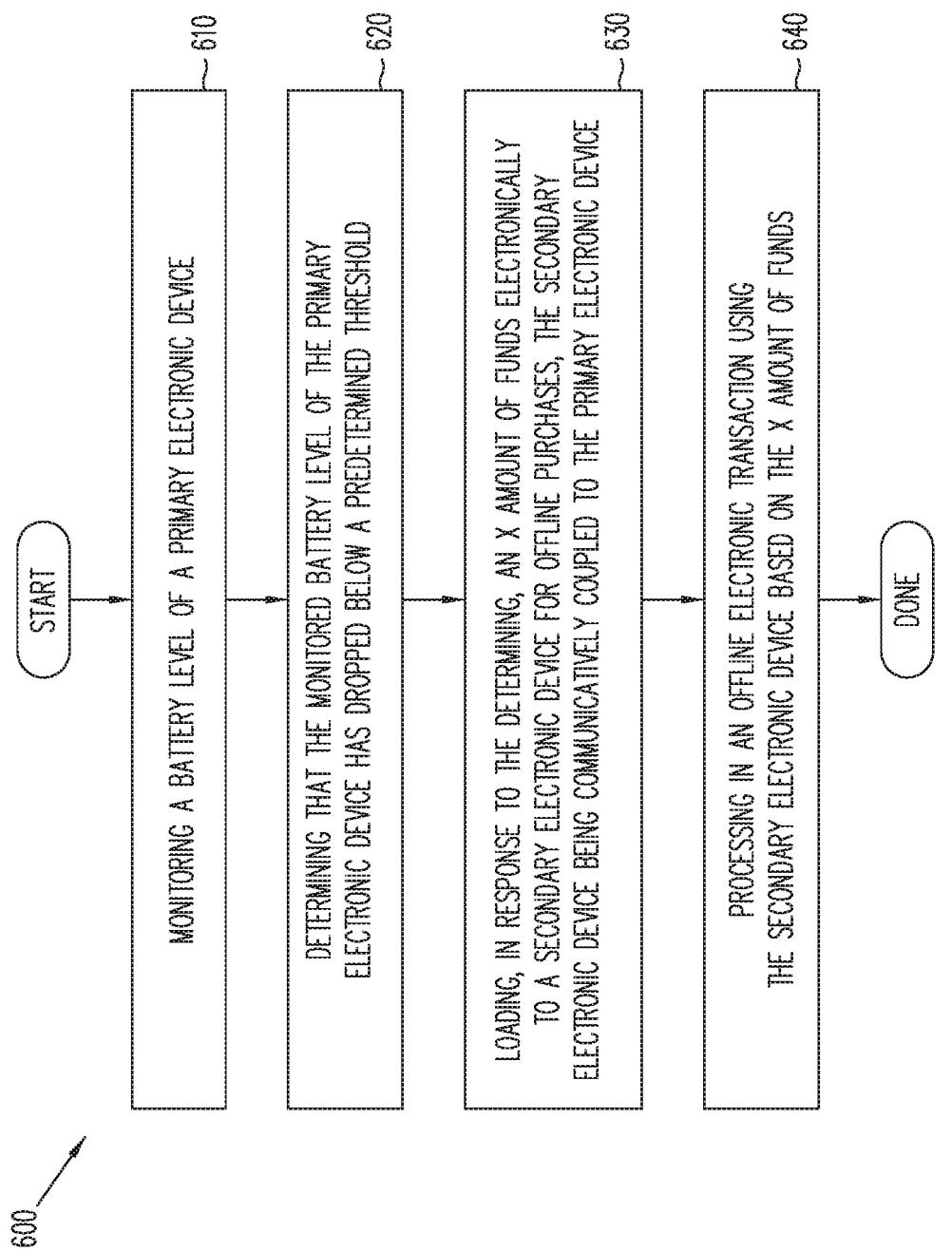

FIG. 10 is a flowchart illustrating a method 600 of engaging in an offline electronic transaction. The method 600 includes a step 610 of monitoring a battery level of a primary electronic device. In some embodiments, the primary electronic device is a smartphone or a tablet computer.

The method 600 includes a step 620 of determining that the monitored battery level of the primary electronic device has dropped below a predetermined threshold.

The method 600 includes a step 630 of loading, in response to the determining, an X amount of funds electronically to a secondary electronic device for offline purchases. The secondary electronic device may include a wearable device and is communicatively coupled to the primary electronic device.

The method 600 includes a step 640 of processing an offline electronic transaction using the secondary electronic device based on the X amount of funds.

In some embodiments, the secondary electronic device includes a communications interface. In some embodiments, the loading the X amount of funds electronically to the secondary electronic device is accompanied by updating the communications interface to indicate funds being loaded to the secondary electronic device.

It is understood that at least some of the steps 610-640 are performed at least in part by an app installed on the primary electronic device, or at least in part by one or more electronic processors of a system that is located remotely from the primary electronic device. It is also understood that additional method steps may be performed before, during, or after the steps 610-640 discussed above. For example, in some embodiments, the method 600 further includes a step of communicating an alert to a user of the primary electronic device in response to the determining that the monitored battery level of the primary electronic device has dropped below the predetermined threshold and before the loading of the X amount of funds to the secondary electronic device.

It is also understood that one or more of the steps of the method 600 described herein may be omitted, combined, or performed in a different sequence as desired.

Based on the above discussions, it can be seen that the present disclosure offers various advantages over conventional payment schemes. It is understood, however, that not all advantages are necessarily disclosed herein, different embodiments may offer different advantages, and that no particular advantage is required for all embodiments. One advantage is that the offline transactions can be conveniently conducted using a primary electronic device or a secondary electronic device communicatively coupled to the primary electronic device. When the primary electronic device's battery is about to die, the primary electronic device itself may not be able to perform online or offline payments. The present disclosure recognizes this situation before the primary electronic device runs out of battery power and accordingly loads the funds into the secondary electronic device for offline payments. In another situation, the present disclosure recognizes the fact that online payments may not be possible when Internet service is unreliable. Thus, the present disclosure determines (ahead of time) that the primary electronic device is about to go into an area with unreliable Internet connectivity. Based on this determination, the funds are loaded into either the primary electronic device or the secondary electronic device, so that the transactions can still be conducted even though Internet service may not be available. Another advantage is that the offline transaction mode may be automatically activated without the user's manual instructions, or that an alert may be sent to the user to inform him/her that offline transactions may be needed. Therefore, the user won't be caught off guard when he/she cannot conduct transactions online.

Figure 11:
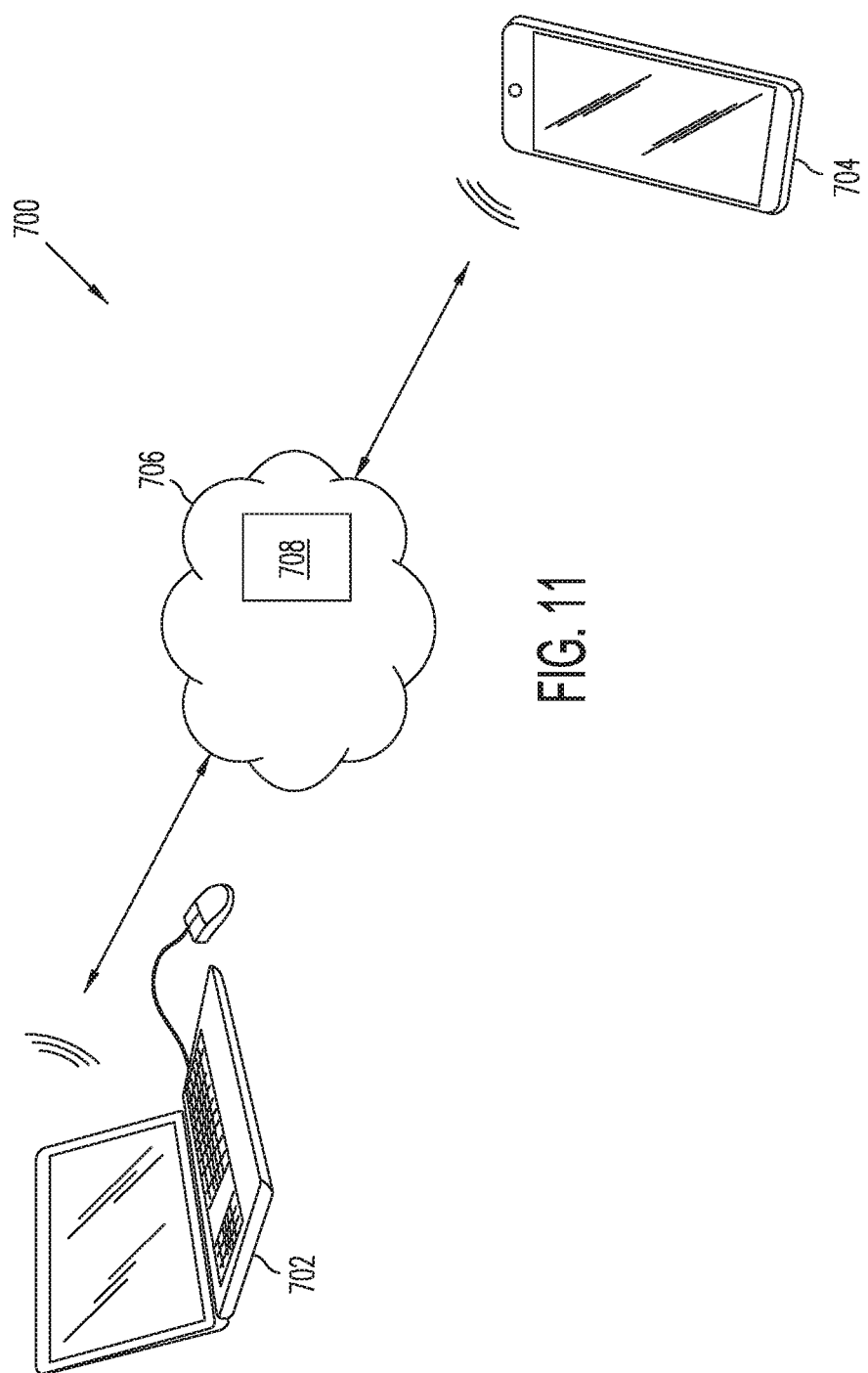
FIG. 11 is a diagram illustrating an example cloud computing architecture according to embodiments of the present disclosure.

FIG. 11 illustrates an example cloud-based computing architecture 700, which may also be used to implement various aspects of the present disclosure. The cloud-based computing architecture 700 includes a mobile device 704 and a computer 702, both connected to a computer network 706 (e.g., the Internet or an intranet). In one example, a consumer has the mobile device 704, which is configured to access identity platforms and initiate purchasing transactions therethrough.

The mobile device 704 is in communication with cloud-based resources 708, which may include one or more computers, such as server computers, with adequate memory resources to handle requests from a variety of users. A given embodiment may divide up the functionality between the mobile device 704 and the cloud-based resources 708 in any appropriate manner. For example, an app on mobile device 704 may perform basic input/output interactions with the user, but a majority of the processing and caching may be performed by the cloud-based resources 708. However, other divisions of responsibility are also possible in various embodiments.

The cloud-based computing architecture 700 also includes the personal computer 702 in communication with the cloud-based resources 708. In one example, a participating merchant or consumer/user may access information from the cloud-based resources 708 by logging on to a merchant account or a user account at computer 702.

It is understood that the various components of cloud-based computing architecture 700 are shown as examples only. For instance, a given user may access the cloud-based resources 708 by a number of devices, not all of the devices being mobile devices. Similarly, a merchant or another user may access resources 708 from any number of suitable mobile or non-mobile devices. Furthermore, the cloud-based resources 708 may accommodate many merchants and users in various embodiments.

Figure 12:
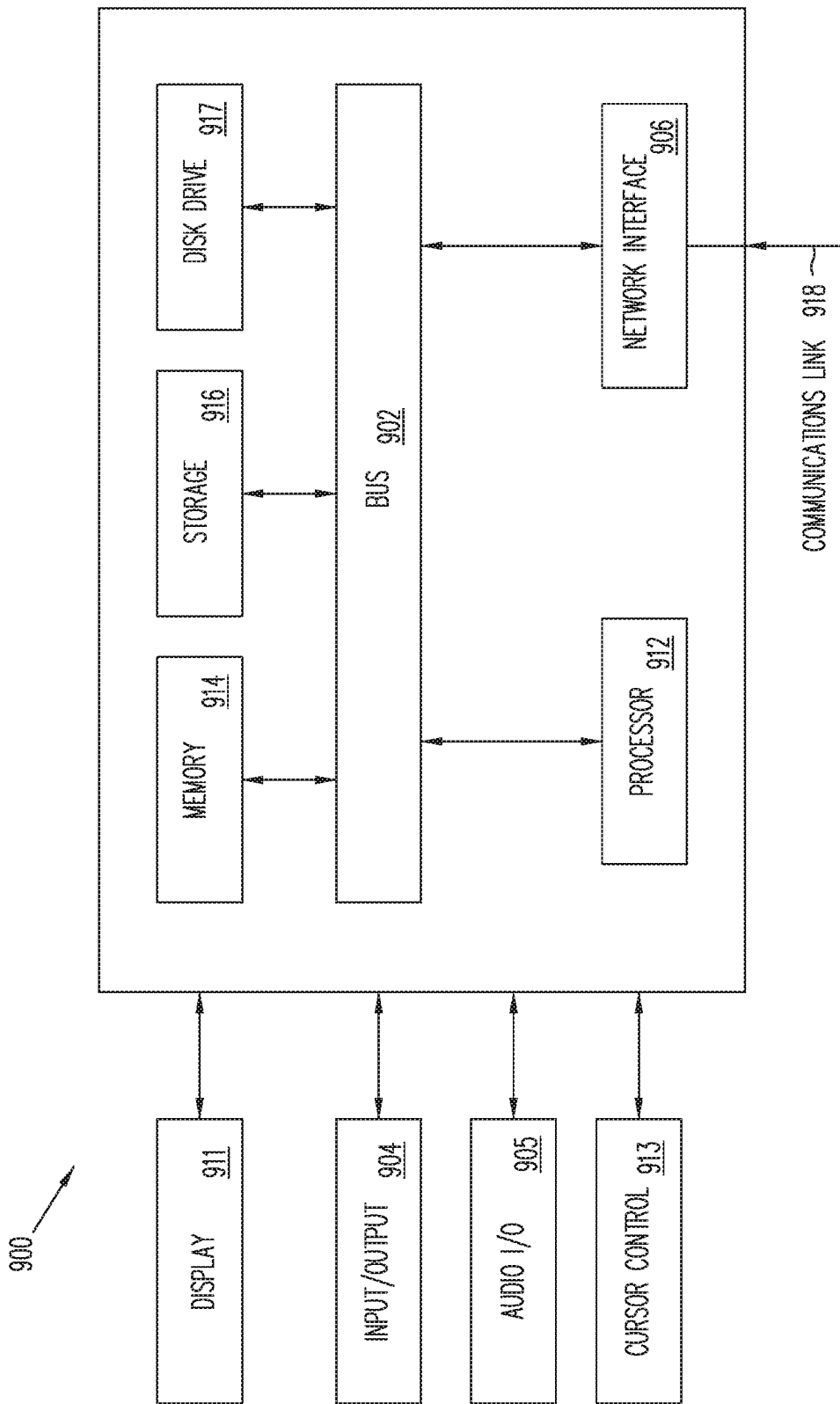
FIG. 12 is a block diagram of a computer system suitable for implementing one or more components in FIG. 1 or 2 according to embodiments of the present disclosure.

FIG. 12 is a block diagram of a computer system 900 suitable for implementing one or more embodiments of the present disclosure. In various implementations, the user device may comprise a personal computing device (e.g., smart phone, a computing tablet, a personal computer, laptop, wearable device, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 900 in a manner as follows.

Computer system 900 includes a bus 902 or other communication mechanism for communicating information data, signals, and information between various components of computer system 900. Components include an input/output (I/O) component 904 that processes a user action, such as selecting keys from a keypad/keyboard, selecting one or more buttons or links, etc., and sends a corresponding signal to bus 902. I/O component 904 may also include an output component, such as a display 911 and a cursor control 913 (such as a keyboard, keypad, mouse, etc.). An optional audio input/output component 905 may also be included to allow a user to use voice for inputting information by converting audio signals. Audio I/O component 905 may allow the user to hear audio. A transceiver or network interface 906 transmits and receives signals between computer system 900 and other devices, such as another user device, a merchant server, or a payment provider server via network 360. In one embodiment, the transmission is wireless, although other transmission mediums and methods may also be suitable. A processor 912, which can be a microcontroller, digital signal processor (DSP), or other processing component, processes these various signals, such as for display on computer system 900 or transmission to other devices via a communication link 918. Processor 912 may also control transmission of information, such as cookies or IP addresses, to other devices.

Components of computer system 900 also include a system memory component 914 (e.g., RAM), a static storage component 916 (e.g., ROM), and/or a disk drive 917. Computer system 900 performs specific operations by processor 912 and other components by executing one or more sequences of instructions contained in system memory component 914. Logic may be encoded in a computer readable medium, which may refer to any medium that participates in providing instructions to processor 912 for execution. Such a medium may take many forms, including but not limited to, non-volatile media, volatile media, and transmission media. In various implementations, non-volatile media includes optical or magnetic disks, volatile media includes dynamic memory, such as system memory component 914, and transmission media includes coaxial cables, copper wire, and fiber optics, including wires that comprise bus 902. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 900. In various other embodiments of the present disclosure, a plurality of computer systems 900 coupled by communication link 918 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

One aspect of the present disclosure involves a method of facilitating an offline transaction. A geographical zone is determined where Internet connectivity is unreliable for a primary electronic device. A detection is made that the primary electronic device is about to enter the geographical zone. In response to the detecting, an X amount of funds is made electronically available offline for the primary electronic device. An offline electronic transaction is processed using the primary electronic device based on the X amount of funds, the offline electronic transaction being conducted within the geographical zone.

Another aspect of the present disclosure involves an offline payment system. The offline payment system includes a non-transitory memory storing instructions. The offline payment system also includes one or more hardware processors coupled to the non-transitory memory and configured to read instructions from the non-transitory memory to cause the system to perform operations comprising: determining a geographical zone where Internet connectivity is unreliable for a primary electronic device; detecting that the primary electronic device is about to enter the geographical zone; in response to the detecting, making an X amount of funds electronically available offline for the primary electronic device; and processed in an offline electronic transaction using the primary electronic device based on the X amount of funds, the offline electronic transaction being conducted within the geographical zone.

Yet another aspect of the present disclosure involves a method of facilitating offline transactions. A battery level of a primary electronic device is monitored. A determination is made that the monitored battery level of the primary electronic device has dropped below a predetermined threshold. In response to the determining, an X amount of funds is loaded electronically to a secondary electronic device for offline purchases. The secondary electronic device is communicatively coupled to the primary electronic device. An offline electronic transaction is processed using the secondary electronic device based on the X amount of funds.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   a non-transitory memory storing instructions; and
   one or more hardware processors coupled to the non-transitory memory and configured to read instructions from the non-transitory memory to cause the system to perform operations comprising:
   monitoring, via a primary electronic device of a user, a battery level of the primary electronic device;
   determining that the monitored battery level of the primary electronic device has dropped below a threshold;
   causing, in response to the determining, a first communications interface of the primary electronic device to display a virtual mechanism configured to enable the user to select, in response to an engagement from the user via the first communications interface, an amount of funds to load into a secondary electronic device for offline purchases;

receiving, from the primary electronic device via the virtual mechanism, a first amount of funds;

loading, in response to the receiving, the first amount of funds electronically to the secondary electronic device for offline purchases, the secondary electronic device being communicatively coupled to the primary electronic device via Bluetooth, Wi-Fi, or Near Field Communications (NFC); and processing an offline electronic transaction using the secondary electronic device based on the first amount of funds.

2. The system of claim 1, wherein:

the secondary electronic device comprises a second communications interface; and the loading the first amount of funds electronically to the secondary electronic device is accompanied by updating the second communications interface to indicate funds being loaded to the secondary electronic device.

3. The system of claim 1, wherein the operations further comprise: communicating an alert to the user of the primary electronic device in response to the determining and before the loading of the first amount of funds to the secondary electronic device.

4. The system of claim 1, wherein:

the primary electronic device is a smartphone or a tablet computer;

the secondary electronic device is a wearable electronic device that includes a display screen or one or more physical buttons; and the loading or the processing of the offline electronic transaction causes the display screen or the one more physical buttons to undergo visual or audio changes.

5. The system of claim 1, wherein the determining comprises:

calculating a battery drain rate of the primary electronic device;

estimating an amount of time that the primary electronic device is expected to last based on the battery drain rate and based on a current battery level of the primary electronic device; and deeming that the threshold has been reached when the estimated amount of time is less than a predetermined amount of time.

6. The system of claim 1, wherein a remaining amount of funds is available to the secondary electronic device after the processing of the offline electronic transaction, and wherein the operations further comprise:

detecting, after the processing of the offline electronic transaction, that the monitored battery level of the primary electronic device has risen above the threshold; and refunding, in response to the detecting, the remaining amount of funds back to the primary electronic device.

7. The system of claim 1, wherein the operations further comprise: calculating a limit of the amount of funds for offline purchases, the calculating based on one or more factors including: a credit history of the user, a previous offline transaction history of the user, a transaction history of a merchant involved in the offline electronic transaction, or a geographical location of the primary electronic device.

8. A method of facilitating offline transactions, comprising:

monitoring, via a primary electronic device of a user, a battery level of the primary electronic device via one or more hardware processors of the primary electronic device;

determining, via the one or more hardware processors, that the monitored battery level of the primary electronic device has dropped below a threshold;

causing, in response to the determining, a first communications interface of the primary electronic device to display a virtual mechanism configured to enable a user to select, based on an engagement from the user via the first communications interface, an amount of funds to load into a secondary electronic device for offline purchases;

receiving, from the primary electronic device via the virtual mechanism, a first amount of funds;

loading, in response to the receiving, the first amount of funds electronically to the secondary electronic device for offline purchases, the secondary electronic device being communicatively coupled to the primary electronic device via Bluetooth, Wi-Fi, or Near Field Communications (NFC); and processing an offline electronic transaction using the secondary electronic device based on the first amount of funds.

9. The method of claim 8, wherein:

the secondary electronic device comprises a second communications interface; and the loading the first amount of funds electronically to the secondary electronic device is accompanied by updating the second communications interface to indicate funds being loaded to the secondary electronic device.

10. The method of claim 8, further comprising: communicating an alert to the user of the primary electronic device in response to the determining and before the loading of the first amount of funds to the secondary electronic device.

11. The method of claim 8, wherein:

the primary electronic device is a smartphone or a tablet computer;

the secondary electronic device is a wearable electronic device that includes a display screen or one or more physical buttons; and the loading or the processing of the offline electronic transaction causes the display screen or the one more physical buttons to undergo visual or audio changes.

12. The method of claim 8, wherein the determining comprises:

calculating a battery drain rate of the primary electronic device;

estimating an amount of time that the primary electronic device is expected to last based on the battery drain rate and based on a current battery level of the primary electronic device; and deeming that the threshold has been reached when the estimated amount of time is less than a predetermined amount of time.

13. The method of claim 12, wherein a remaining amount of funds is available to the secondary electronic device after the processing of the offline electronic transaction, and wherein the method further comprises:

detecting, after the processing of the offline electronic transaction, that the monitored battery level of the primary electronic device has risen above the threshold; and refunding, in response to the detecting, the remaining amount of funds back to the primary electronic device.

14. The method of claim 8, further comprising: calculating a limit of the amount of funds for offline purchases, the calculating based on one or more factors including: a credit history of the user, a previous offline transaction history of the user, a transaction history of a merchant involved in the offline electronic transaction, or a geographical location of the primary electronic device.

15. A non-transitory machine-readable medium having stored thereon machine-readable instructions executable to cause a machine to perform operations comprising:
    measuring a remaining amount of battery life of a primary electronic device of a user via one or more hardware processors of the primary electronic device;
    projecting, via the one or more hardware processors, that the remaining amount of battery life of the primary electronic device will not last beyond a predetermined period of time;
    causing, in response to the projecting, a first communications interface of the primary electronic device to display a virtual mechanism configured to enable the user to select, in response to an engagement from the user via the first communications interface, an amount of funds to load into a secondary electronic device for offline purchases;
    receiving, from the primary electronic device via the virtual mechanism, a first amount of funds;
    loading, in response to the projecting and to the receiving, the first amount of funds electronically to the secondary electronic device for offline purchases, the secondary electronic device being communicatively coupled to the primary electronic device via Bluetooth, Wi-Fi, or Near Field Communications (NFC); and
    processing an offline electronic transaction using the secondary electronic device based on the first amount of funds.

16. The non-transitory machine-readable medium of claim 15, wherein:
    the secondary electronic device comprises a second communications interface; and
    the loading the first amount of funds electronically to the secondary electronic device is accompanied by updating the second communications interface to indicate funds being loaded to the secondary electronic device.

17. The non-transitory machine-readable medium of claim 15, wherein the operations further comprise: communicating an alert to the user of the primary electronic device in response to the projecting and before the loading of the first amount of funds to the secondary electronic device.

18. The non-transitory machine-readable medium of claim 15, wherein:
    the primary electronic device is a smartphone or a tablet computer;
    the secondary electronic device is a wearable electronic device that includes a display screen or one or more physical buttons; and
    the loading or the processing of the offline electronic transaction causes the display screen or the one more physical buttons to undergo visual or audio changes.

19. The non-transitory machine-readable medium of claim 15, wherein the projecting comprises:
    calculating a battery drain rate of the primary electronic device;
    estimating an amount of time that the primary electronic device is expected to last based on the battery drain rate and based on a current battery level of the primary electronic device; and
    determining that the estimated amount of time is less than the predetermined period of time.

20. The non-transitory machine-readable medium of claim 15, wherein a remaining amount of funds is available to the secondary electronic device after the processing of the offline electronic transaction, and wherein the operations further comprise:
    detecting, after the processing of the offline electronic transaction, that the remaining amount of battery life of the primary electronic device will last beyond the predetermined period of time; and
    refunding, in response to the detecting, the remaining amount of funds back to the primary electronic device.

* * * * *